United States Patent [19]

Wallsten

[11] 4,160,535

[45] Jul. 10, 1979

[54] CONICAL FILTER HOLDER

[75] Inventor: Thomas S. Wallsten, Chapel Hill, N.C.

[73] Assignee: Berkshire Paper Company, Great Barrington, Mass.

[21] Appl. No.: 902,295

[22] Filed: May 3, 1978

[51] Int. Cl.² .................. B01D 23/28; B65B 39/00; B67C 11/00

[52] U.S. Cl. .................................................. 248/94

[58] Field of Search ............... 248/94; 141/340–343; 209/409, 411, 412, 413; 210/241, 249, 250, 470, 471, 473, 474, 477, 479, 480, 481; 93/1 D, 1.1; 428/12, 51; 211/14; 229/1.5 H, DIG. 7, DIG. 9

[56] References Cited

U.S. PATENT DOCUMENTS

| | | | |
|---|---|---|---|
| 2,897,969 | 8/1959 | Bader | 210/471 |
| 3,235,088 | 2/1966 | Painter et al. | 248/94 |

*Primary Examiner*—Frank Sever
*Attorney, Agent, or Firm*—Howard C. Miskin

[57] ABSTRACT

A collapsible holder for a conically shaped food filter element includes an upper large flat annulus formed of plastic and provided with opposite outwardly directed wings provided with inner medial apertures. A lower small flat annulus is provided with opposite elongated side arms delineated therefrom by fold lines, which arms slideably engage respective wing apertures and terminate in enlarged heads wider than the apertures. In the holder operable condition, the smaller annulus is coaxial with and below the larger annulus and suspended therefrom by the extended side arms and in its collapsed condition the annuli are at about the same level with one of the side arms being pulled through the wing aperture and overlying the other flattened side arm.

9 Claims, 6 Drawing Figures

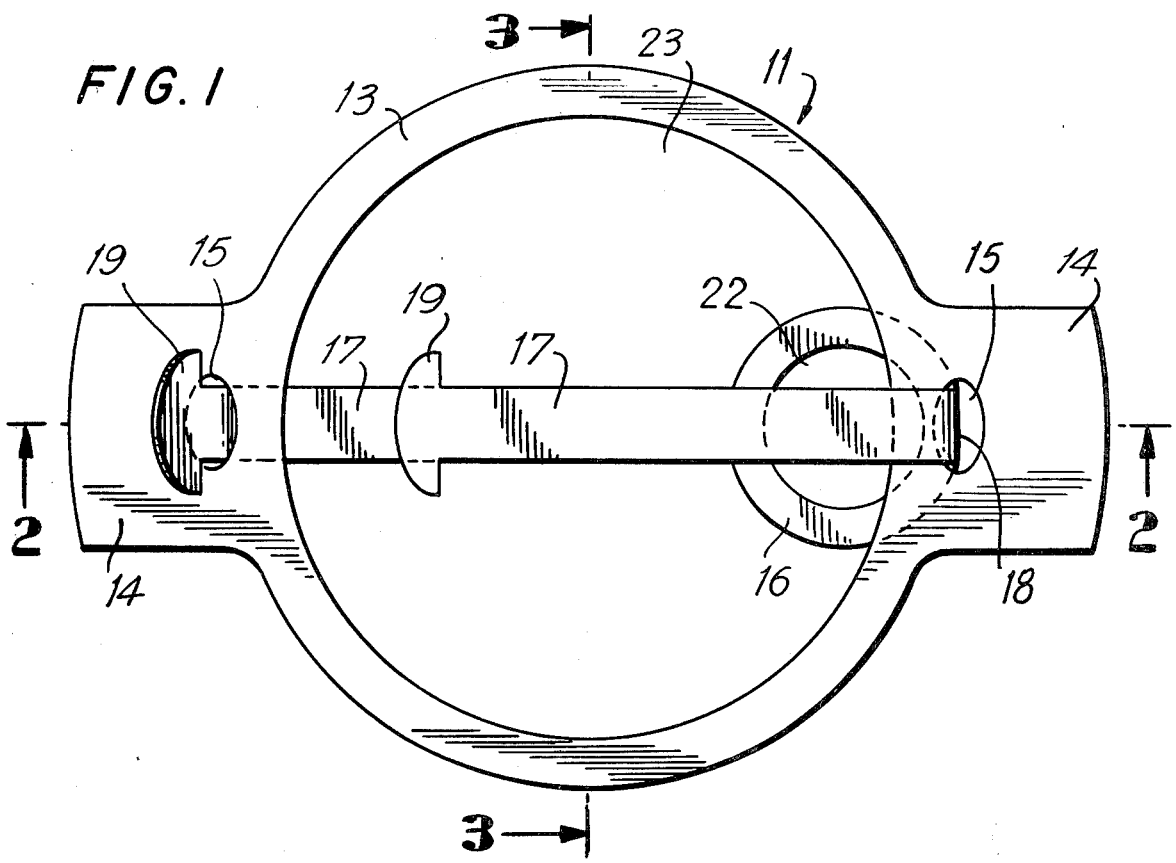
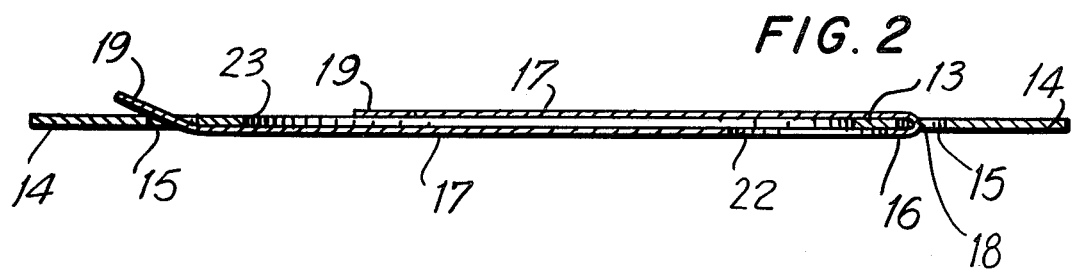
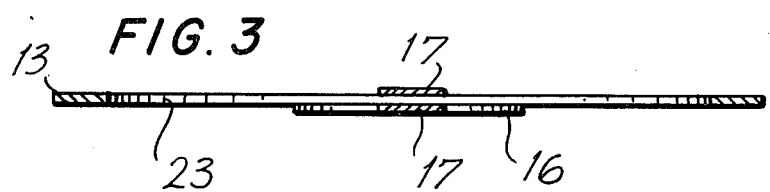
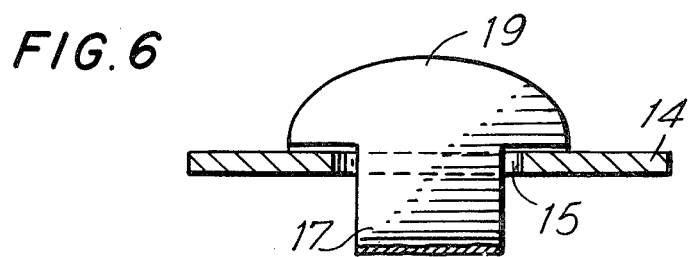

CONICAL FILTER HOLDER

BACKGROUND OF THE INVENTION

The present invention relates generally to improvements in filtering devices and it relates more particularly to an improved collapsible holder for filtering elements for straining fat or brewing coffee and similar processes.

In the straining of fat or shortening oil, the fat or oil is poured into the filter and the fat or oil passes through the filter, with residue and contaminants remaining in the filter.

The cleansed oil can be reused without the residual food particles contaminating the filtered oil. This lengthens the life of the fat or oil, extending the number of times the oil can be used. It is a common practice to employ a conical filter element which is folded from a flat circular blank of filter paper or other filter material. The shaped conical filter element when used is generally supported in a correspondingly shaped funnel having a bottom opening and such filter holder possesses numerous drawbacks and disadvantages. It is a bulky and awkward device which is inconvenient and difficult to handle, store and dispense, it frequently impedes the passage of liquid through the filter; it is of little versatility and adaptability and otherwise leaves much to be desired.

SUMMARY OF THE INVENTION

It is a principal object of the present invention to provide an improved filtering device.

Another object of the present invention is to provide an improved filter holder.

Still another object of the present invention is to provide an improved holder for conically shaped filters.

A further object of the present invention is to provide an improved filter holder which is collapsible to a compact lay flat condition to expedite the storage and dispensing thereof, which is suitable for the brewing of coffee and which is simply and easily expandable to an operative condition.

Still a further object of the present invention is to provide an improved device of the above nature characterized by its low cost, simplicity, ruggedness, ease and convenience of application and use, and high versatility and adaptability.

The above and other objects of the present invention will become apparent from a reading of the following description taken in conjunction with the accompanying drawings which illustrate a preferred embodiment thereof.

In a sense the present invention contemplates the provision of an improved filter holder which comprises a first substantially flat frame member having a relatively large main opening, a second substantially flat frame member having a relatively small opening and support means for suspending said second frame member below and substantially parallel to said first frame members with said openings in vertical coaxial alignment, the support means being collapsible to a condition with the first and second frame members and support means lying along and proximate a common plane.

According to a preferred embodiment of the present invention, the first frame member is a large annulus having diametrically opposite outwardly projecting wings, each wing having a medial coupling aperture at about the junction of the wing with the annulus. The second frame member comprises a relatively small annulus with diametrically opposite arms extending outwardly from the annulus and delineated therefrom by self hinges or fold lines. The arms slideably engage respective coupling apertures and terminate in enlarged heads which prevent the separation of the arms from the coupling apertures. The distance between the underedge of one arm to the base or fold line of the other arm is advantageously about equal to the distance between the coupling apertures.

The improved filter device is simple, rugged, reliable and inexpensive, is highly compact in its collapsed condition, is easy and convenient to expand, apply and use, and is of great versatility and adaptability.

BRIEF DESCRIPTION OF THE PREFERRED EMBODIMENT

FIG. 1 is a top plan view of the improved filter holder shown in its collapsed lay flat condition;

FIG. 2 is a sectional view taken along line 2—2 in FIG. 1;

FIG. 3 is a sectional view taken along line 3—3 in FIG. 1;

FIG. 6 is a sectional view taken along line 6—6 in FIG. 4.

DESCRIPTION OF THE PREFERRED EMBODIMENT

Figure 4:
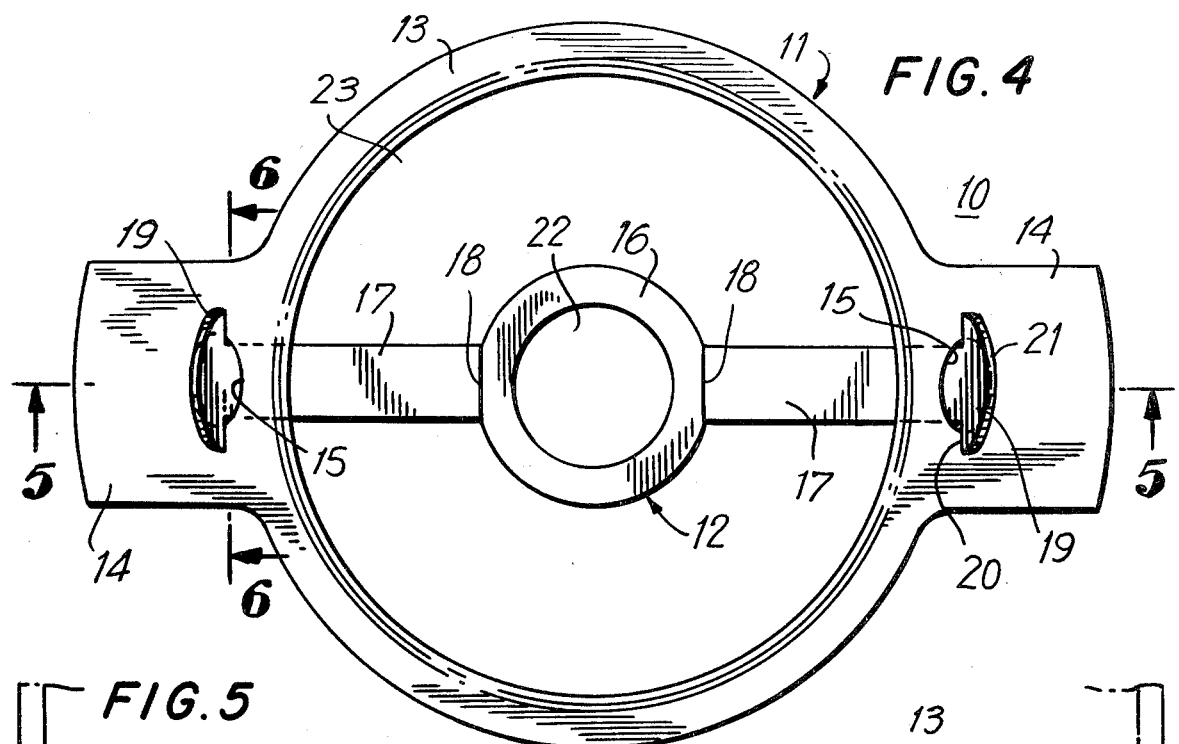
FIG. 4 is a top plan view of the filter holder shown in its extended operative condition.

Referring now to the drawings which illustrate a preferred embodiment of the present invention, the reference numeral 10 generally designates the improved filter holder which is shaped and dimensioned, by way of example, to support a conical filter F formed in the conventional manner of a flat circular blank of filter paper or other filter material. The filter holder 10 includes upper and lower intercoupled integrally formed members 11 and 12 respectively, each of which is formed of any suitable material such as a thermoplastic synthetic organic polymeric resin, for example, a polyolefin such as polypropylene, or polyethylene, nylon or the like and produced by die cutting from sheet, by injection molding or other suitable process.

The filter holder upper member 11 includes a large narrow annulus or flat ring 13 and a pair of diametrically opposite rectangular wing sections integrally formed and coplanar with and projecting laterally outwardly from the annulus 13. The inside diameter of the annulus 13 is somewhat less than the maximum outside diameter of the filter F. Each wing section 14 has a transversely extending medially disposed oval coupling opening 15 formed therein proximate the junction of the respective wing 14 with the annulus 13. The filter holder upper member 11 is advantageously relatively thick and rigid to adequately support the weight of a coffee ground and liquid filled filter F.

The filter holder lower member 12 includes a small annulus or flat ring 16 and a pair of somewhat flexible diametrically opposite outwardly radially projecting flat support or suspension arms 17 in the form of bands delineated at their inner ends from the annulus 16 by transverse linear self hinges or bold lines 18 of reduced thickness. The arms 17 are of lesser width than the coupling opening 15 and project through and slideably engage respective coupling opening 15. Each arm 17 terminates in an enlarged head 19 of greater width and lesser longitudinal dimension than the coupling opening 15. Each arm head 19 is provided with a transverse linear inner or under shoulder 20 and an arcuate outer edge 21 converging at its opposite ends with under shoulder 20. The heads 19, when properly oriented and flexed, are insertable through respective coupling opening 15 to expedite the assembly of upper and lower members 11 and 12 and prevent the full extraction of the arms 17 from openings 15 in the assembled filter holder 10. The longitudinal distance between each head under shoulder 20 and the fold line 18 of the opposite arm 17 is approximately equal to the distance between the transverse axis of coupling openings 15.

Figure 5:
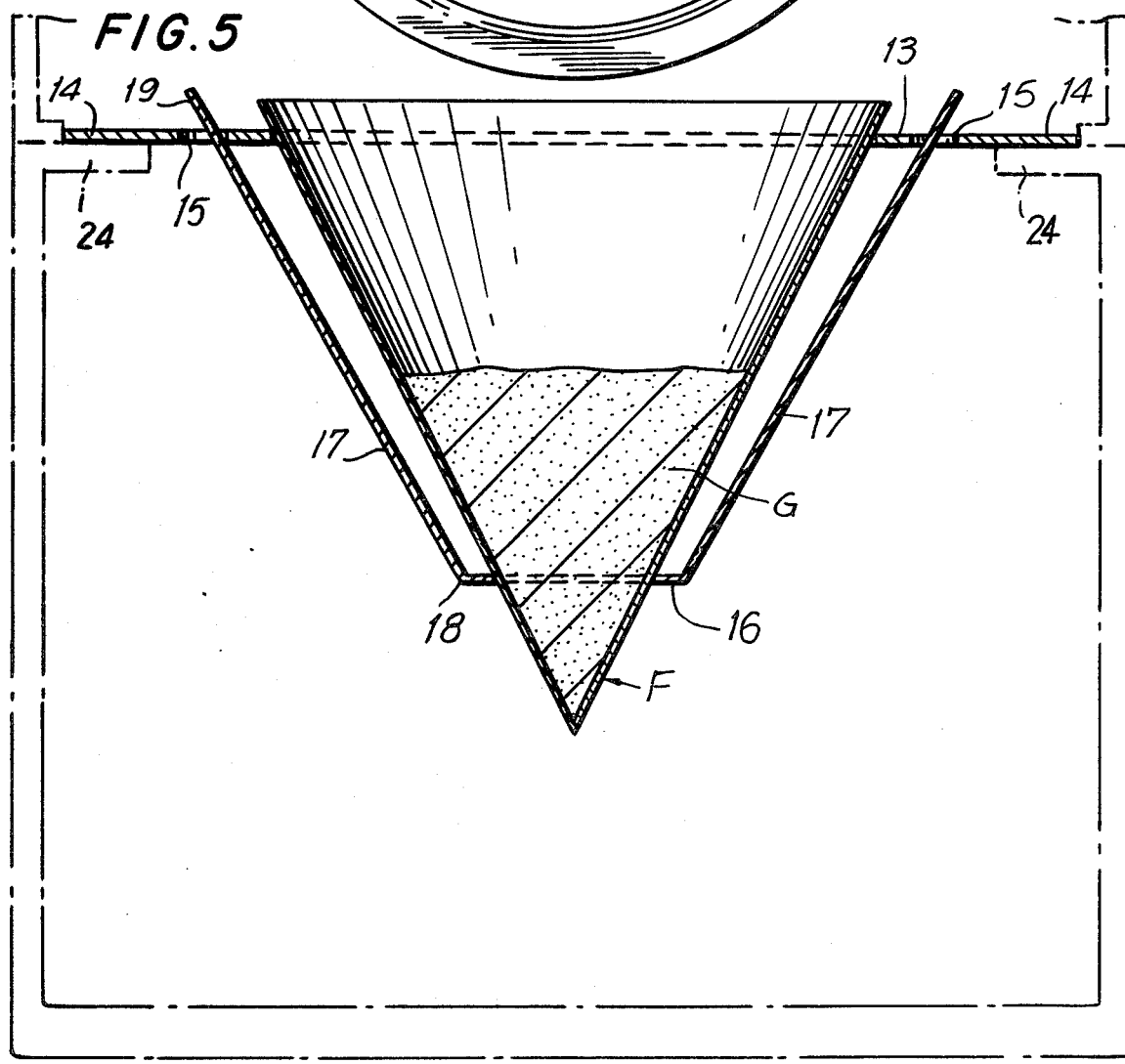
FIG. 5 is a sectional view taken along line 5—5 in FIG. 4, the holder being shown supporting a grounds loaded filter.

Considering now the operation of the improved filter holder 10, in the operative condition of the filter holder as shown in FIGS. 4 to 6, the upper member 11 is horizontally supported by opposite coplanar horizontal shoulders or ledges 24 of a bracket or receiving receptacle 22 of any associated device or apparatus, the ledges 24 engaging the underfaces of wing sections 14. The lower member 12 is suspended by downwardly symmetrically converging arms 17 from the upper member 11 to support the small annulus 16 in a horizontal position below the large annulus 11 with the circular openings 22 and 23 respectively in the small and large annuli 16 and 13 being in vertical coaxial alignment. The shoulders 20 of heads 19 engage the opposite upper borders of coupling openings 15 to support the bands 17 and prevent their separation from the openings 15.

The conical filter F which may be folded from a flat circular filter blank as earlier explained is coaxially positioned in the openings 23 and 22 with the upper border of the filter engaging the edge of large opening 23 and the lower border of the filter proximate its apex engaging the edge of opening 22, the annuli 13 and 16 being dimensioned and spaced to match the filter conical surface. The filter may then be filled with ground coffee G or other brew material through which hot water is then passed or the filter may be otherwise employed.

In collapsing the filter holder 10 for storage as shown in FIGS. 1 to 3, the filter F is merely removed and one of the arms 17 pulled upwardly for its full length through a respective opening 15 by grasping the head 19. With the full upward withdrawal of the one arm 17 the lower annulus is drawn upwardly to the corresponding opening 15 the other arm 17 being pulled therewith, the other arm 17 and annulus 16 assuming coplanar positions directly underlying the flat upper member 11. The upwardly drawn annulus is then folded inwardly about its fold line 18 to a horizontal position directly overlying the upper member 11 and the other arm 17 to complete the collapse of the filter holder 10 to a compact condition. The above procedure is reversed to expand the filter holder 10 to its operative condition.

While there has been described and illustrated a preferred embodiment of the present invention, it is apparent that numerous alterations, omissions and additions may be made without departing from the spirit thereof.

What is claimed is:

1. A filter holder transferrable between a lay flat collapsed condition and an expanded operable condition comprising a first substantially flat frame member formed from a flexible sheet material having a relatively large first opening, a second substantially flat frame member also formed from a flexible sheet material having a relatively small second opening and collapsable support means for suspending and deforming said second frame member below and substantially parallel to said first frame member with said first and second openings in vertical coaxial alignment when said first filter holder is in its expanded condition, said support means being collapsable to said holder lay flat collapsed conditon with said first and second frame members and said support means lying along and proximate a common flat plane; said first and second frame members being united to each other by means to enable said frame members to slide to and from their expanded and collapsed conditions.

2. The filter holder of claim 1 wherein said first and second openings are circular.

3. The filter holder of claim 2 wherein said first frame member includes a first annulus delineating said first opening and said second frame member includes a second annulus delineating said second opening.

4. The filter holder of claim 3 wherein said support means includes a pair of opposite arms extending between said first and second frame members and converging downwardly from said first to said second frame member in the filter holder expanded condition.

5. The filter holder of claim 3 wherein at least one of said arms in swingable relative to said first and second frame members and the other of said arms slidably engages said first frame member and is swingable relative to said second frame member.

6. The filter holder of claim 3 comprising diametrically opposite wing sections projecting outwardly from and coplanar and integrally formed with said first annulus.

7. The filter holder of claim 6 wherein said wing sections have coupling openings formed therein and said support means comprises diametrically opposite outwardly directed elongated arms integrally formed with and swingable relative to said second annulus and slideably engaging respective coupling openings and terminating in enlarged heads.

8. The filter holder of claim 7 wherein said arms are delineated from said second annulus by self hinges.

9. The filter holder of claim 7 wherein the longitudinal distance between the outer end of one arm and the inner end of the other arm is approximately equal to the center-to-center distance between said coupling openings.